United States Patent
Elyashev (10) Patent No.: US 8,694,638 B2
(45) Date of Patent: Apr. 8, 2014

(54) SELECTING A HOST FROM A HOST CLUSTER TO RUN A VIRTUAL MACHINE

(75) Inventor: Vitaly Elyashev, Ramat Gan (IL)

(73) Assignee: Red Hat Israel, Raanana (IL)

( * ) Notice: Subject to any disclaimer, the term of this patent is extended or adjusted under 35 U.S.C. 154(b) by 176 days.

(21) Appl. No.: 12/493,567

(22) Filed: Jun. 29, 2009

(65) Prior Publication Data

US 2010/0332658 A1 Dec. 30, 2010

(51) Int. Cl.
*G06F 15/173* (2006.01)
*G06F 9/455* (2006.01)

(52) U.S. Cl.
USPC ............................. 709/226; 709/224; 718/1

(58) Field of Classification Search
USPC ...................... 709/224, 226; 718/1
See application file for complete search history.

(56) References Cited

U.S. PATENT DOCUMENTS

| | | | |
|---|---|---|---|
| 6,026,475 A * | 2/2000 | Woodman | 711/202 |
| 6,658,473 B1 | 12/2003 | Block et al. | |
| 2005/0251802 A1* | 11/2005 | Bozek et al. | 718/1 |
| 2006/0069761 A1 | 3/2006 | Singh | |
| 2007/0130566 A1 | 6/2007 | van Rietschote et al. | |
| 2007/0271560 A1* | 11/2007 | Wahlert et al. | 718/1 |
| 2007/0282572 A1* | 12/2007 | Larus | 703/2 |
| 2008/0104608 A1* | 5/2008 | Hyser et al. | 718/105 |
| 2008/0184229 A1 | 7/2008 | Rosu et al. | |
| 2009/0210527 A1* | 8/2009 | Kawato | 709/224 |
| 2010/0005465 A1 | 1/2010 | Kawato | |
| 2010/0186010 A1* | 7/2010 | Chalemin et al. | 718/1 |
| 2010/0191936 A1* | 7/2010 | Khatri et al. | 712/42 |
| 2010/0223368 A1* | 9/2010 | Runcie et al. | 709/222 |
| 2010/0332657 A1 | 12/2010 | Elyashev et al. | |

FOREIGN PATENT DOCUMENTS

WO WO 2008/062864 5/2008

OTHER PUBLICATIONS

Clark, Christopher, et al., "Live Migration of Virtual Machines", 2nd Symposium on Networked Systems Design & Implementation (NSDI 2005) May 2-4, 2007, Boston, MA, Proceedings 2005, 14 pp.
Lublin, Uri , et al., "QUMRANET, KVM Live Migration", KVM Forum 2007, 28 pp.
QUMRANET, "KVM migrating a VM", Migration-Kernal based Virtual Machine, last edited Feb. 21, 2008, printed from Internet: http://kvm.qumranet.com/kvmwiki/Migration on Nov. 24, 2008, 5 pp.
Final Office Action for U.S. Appl. No. 12/493,534 mailed Jul. 6, 2011.
Office Action for U.S. Appl. No. 12/493,534 mailed Jan. 11, 2011.
USPTO Office Action for U.S. Appl. No. 12/493,534 mailed May 9, 2012.

(Continued)

*Primary Examiner* — Jeong S Park
(74) *Attorney, Agent, or Firm* — Lowenstein Sandler LLP (57) ABSTRACT

A host controller selects a host from a host cluster to run a virtual machine. In one embodiment, a host controller receives a request to run a virtual machine. The virtual machine may be a newly added virtual machine, or an existing virtual machine that needs to migrate from a currently active host to another host. The host controller selects a host from the host cluster based on current central processing unit (CPU) consumption and expected load to be incurred by the virtual machine. The expected load may be estimated from the number of cores to be used by the virtual machine. The host controller then assigns the virtual machine to run on the host.

20 Claims, 5 Drawing Sheets

(56) References Cited

OTHER PUBLICATIONS

USPTO Office Action for U.S. Appl. No. 12/493,534 mailed Oct. 16, 2012.

USPTO Notice of Allowance Action for U.S. Appl. No. 12/493,534 mailed Oct. 16, 2012.

* cited by examiner

SELECTING A HOST FROM A HOST CLUSTER TO RUN A VIRTUAL MACHINE

TECHNICAL FIELD

Embodiments of the present invention relate to a computer system, and more specifically, to virtual machine management.

BACKGROUND

A virtual machine is a software implementation of a machine (computer) that includes its own operating system (referred to as a guest operating system) and executes application programs. A host computer allocates a certain amount of its resources to each of the virtual machines, and multiplexes its underlying hardware platform among the virtual machines. Each virtual machine is then able to use the allocated resources to execute its guest operating system and applications. The software layer providing the virtualization is commonly referred to as a hypervisor and is also known as a virtual machine monitor (VMM), a kernel-based hypervisor, or part of a host operating system. The hypervisor emulates the underlying hardware of the host computer, making the use of the virtual machine transparent to the guest operating system and the user of the computer.

A host computer can run multiple virtual machines simultaneously. Multiple host computers can be clustered together to provide a large number of virtual machines to an enterprise. During the course of time, some of the hosts in a cluster may become overloaded and some under-loaded. Load imbalance can cause performance degradation. Thus, there is a need to manage the load on the hosts.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Described herein is a method and system for selecting a host from a host cluster to run a virtual machine. In one embodiment, a host controller receives a request to run a virtual machine. The virtual machine may be a newly added virtual machine, or an existing virtual machine that needs to migrate from a currently active host to another host. The host controller selects a host from the host cluster based on current central processing unit (CPU) consumption and expected load to be incurred by the virtual machine. The expected load may be estimated from the number of cores to be used by the virtual machine. The host controller then assigns the virtual machine to run on the selected host.

In some conventional systems, a system administrator determines which host to run a given virtual machine. Manual selection of hosts can be time-consuming if load balancing is taken into consideration. According to one embodiment of the present invention, the host controller selects a host based on a host selection rating calculated from the current and expected CPU load of the host. After a host is selected based on the rating, the host controller checks the available memory of the selected host to confirm that the host can accommodate the memory requirement of the virtual machine. The selection of the host takes load balancing into consideration without the need for manual selection by a system administrator.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "selecting", "assigning", "estimating", "determining", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

Figure 1:
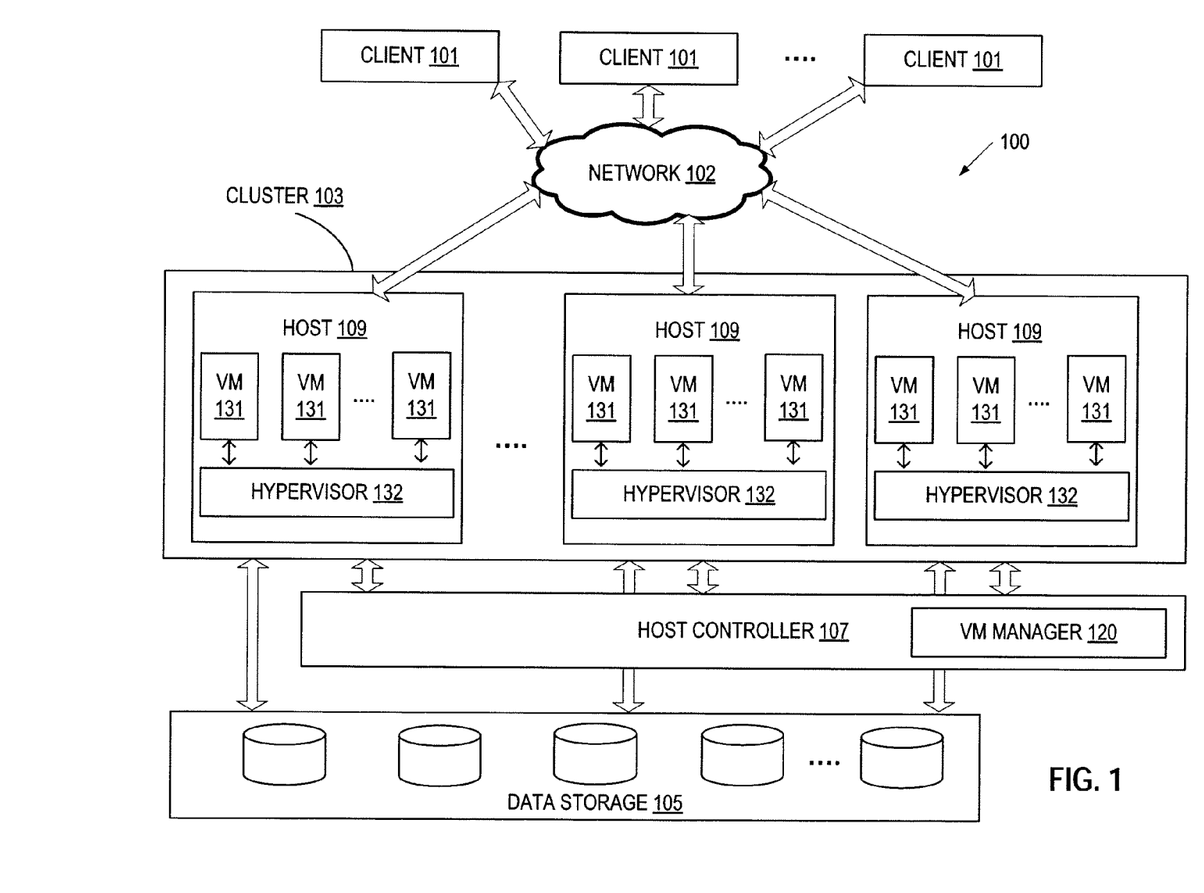
FIG. 1 is a block diagram illustrating one embodiment of a host cluster controlled by a host controller.

FIG. 1 illustrates an exemplary network architecture 100 in which embodiments of the present invention may operate. The network architecture 100 includes a cluster of hosts 103 (also referred to as "cluster" or "host cluster") coupled to one or more clients 101 over a network 102. The network 102 may be a private network (e.g., a local area network (LAN), a wide area network (WAN), intranet, etc.) or a public network (e.g., the Internet). The cluster 103 includes a plurality of host computers 109 (also referred to as "hosts"). The cluster 103 is also coupled to data storage 105. The data storage 105 includes one or more mass storage devices (e.g., disks), which form a storage pool shared by all of the hosts 109 in the cluster 103.

The clients 101 may include computing devices that have a wide range of processing capabilities. The client 101 may run client applications such as a Web browser and a graphic user interface (GUI). The client 101 may also run other client applications, which receive multimedia data streams or other data from one or more host computers 109 and re-direct the received data to a local display or other user interface.

Each host 109 may run one or more virtual machines 131. Each virtual machine 131 runs a guest operating system (OS) that may be different from one virtual machine to another. The guest OS may include Microsoft Windows, Linux, Solaris, Mac OS, etc. Each host 109 may include a hypervisor 132 that emulates the underlying hardware platform for the virtual machines 131. The hypervisor 132 may also be known as a virtual machine monitor (VMM) or a kernel-based hypervisor. In some embodiments, the hypervisor 132 is part of a host operating system.

Each virtual machine 131 can be accessed by one or more of the clients 101 over the network 102. In one scenario, each virtual machine 131 provides a virtual desktop for the client 101. From the user's point of view, the virtual desktop functions as a physical desktop (e.g., a personal computer) and is indistinguishable from a physical desktop.

The hosts 109 can be managed by a host controller 107. The host controller 107 may be a computer coupled to the cluster 103 directly or via a network. Alternatively, the host controller 107 may be part of one of the hosts 109. The host controller 107 may add a virtual machine, delete a virtual machine, balance the load on the cluster 103, power on/off the hosts 109, provide directory service to the virtual machines 131, and perform other managerial functions.

According to one embodiment of the present invention, the host controller 107 includes a virtual machine (VM) manager 120 to manage the load on the hosts 109. The VM manager 120 monitors the load on each host 109 and stores collected resource usage data of the host 109 (e.g., average CPU utilization, the number of virtual machines that are currently running on the host) in memory. For each host 109, the VM manager 120 also keeps track of the resources (e.g., the number of cores, physical memory size, processing speed, etc.) provided by the host, configurable data items of the host (e.g., host strength, memory over-commitment percentage, VCPU consumption percentage, etc), and configurable data items for the virtual machines 131 currently running on the host (e.g., requested number of VCPUs and requested memory size). Additional data items relating to the host 109 and the virtual machines 131 may also be stored.

Before further describing embodiments of the present invention, it is helpful to explain the terminologies that are mentioned above. The term "core" herein refers to a central processing unit (CPU) within a host computer. The host 109 can contain multiple cores that are integrated onto a single integrated circuit die or multiple dies in a single chip package. A virtual machine can be configured to run on one or more cores of the host 109. The number of cores on which a virtual machine is configured to run is referred to as "the number of VCPUs." For example, a virtual machine can be configured to run on 4 VCPUs, which means that the virtual machine is to run on 4 cores of a host computer (which has at least 4 cores). In one embodiment, the load incurred by a virtual machine on a host 109 can be estimated from the number of VCPUs used by the virtual machine.

Additionally, the term "VCPU consumption percentage" herein refers to a configurable value that is an estimation of the percentage of load on the host 109 incurred by a single virtual machine. For example, when VCPU consumption percentage of a host is set to 10%, it means that each virtual machine on the host is estimated to use 10% of the processing power of a core of the host.

Another configurable data item is "host strength." The term "host strength" herein refers to a grade given by a user (e.g., a system administrator) to a host. The grade can be given based on the processing speed, powerfulness of the host architecture, host operating environment, and/or other factors perceived by the user to be important. The value of the "host strength" can be a positive number greater than or equal to 1. For example, if the majority of the hosts in the cluster are the same, the host strength for these hosts can be set to 100. The strength of the rest of the hosts can be set relative to the host strength 100. If a host has older architecture, an older operating system, or is occupied with other tasks, the strength of this host can be set to 70. That is, this host is considered to have about 70% of the strength compared to the majority of the hosts.

With respect to the memory, the term "over-commitment percentage" herein refers to a configurable percentage that can be used to extend a host's actual physical memory size. For example, a host having 8 gigabytes of memory with 200% over-commitment percentage can be used as if the host computer had 16 gigabytes of memory. Assuming that each virtual machine uses 1 gigabyte of memory, the host computer with an over-commitment percentage of 200% can run 16 virtual machines. The use of the over-commitment percentage is enabled by data deduplication. With data deduplication, duplicated data items, which are shared by multiple virtual machines, can be removed from the memory of a host. As a result, the host can often be used as if it had a larger memory size than its actual memory size. In one embodiment, the over-commitment percentage can be configured by a user (e.g., a system administrator). The user may set the over-commitment percentage for a host based on historical usage data or the characteristics of the virtual machines that run on the host.

Operations of the VM manager 120 will be described in greater detail with references to FIGS. 2-4.

Figure 2:
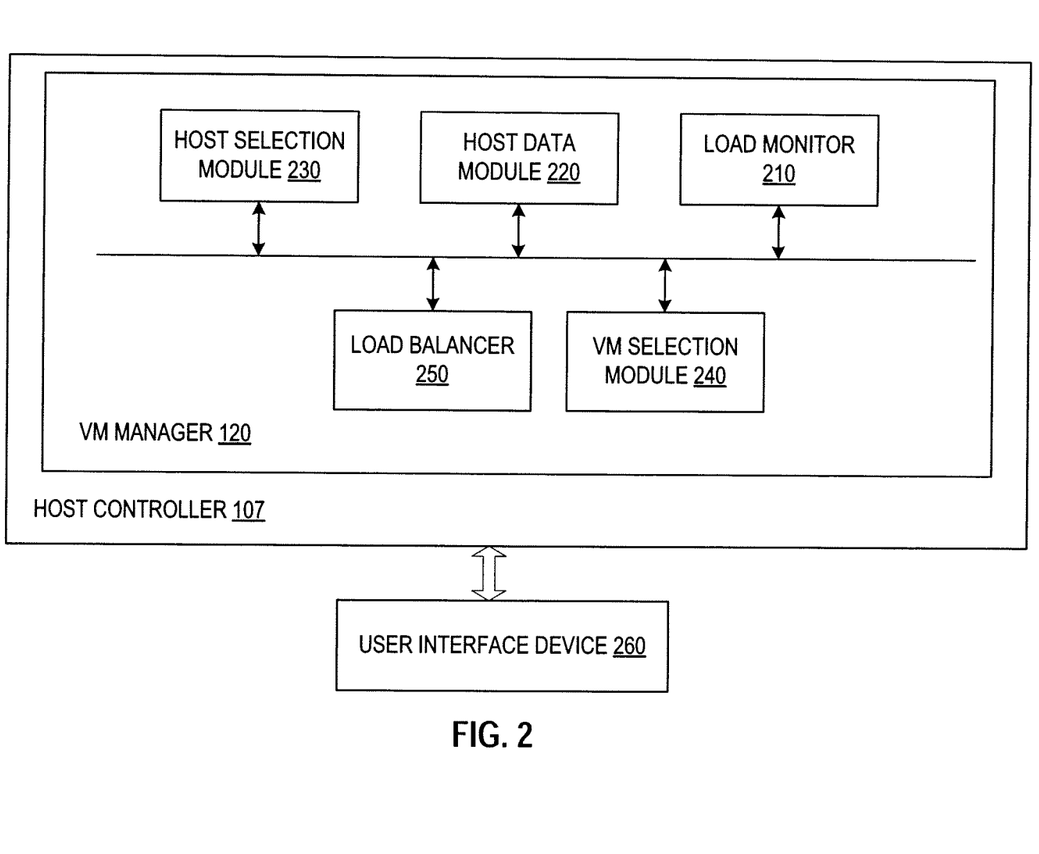
FIG. 2 is a block diagram illustrating one embodiment of a virtual machine manager in the host controller of FIG. 1.

FIG. 2 illustrates an embodiment of the VM manager 120 in the host controller 107. The host controller 107 is coupled to a user interface device 260 (e.g., a display that provides a graphical user interface) to receive user requests and inputs, including configurable data items for each host 109 and for the virtual machines 131 on the host 109. The VM manager 120 includes a load monitor 210 to monitor the load on each host 109 (e.g., CPU utilization and memory usage). For each host 109 that is currently active, the load monitor 210 monitors the CPU utilization (also referred to as "CPU usage") of the host 109, and the lengths of time during which the CPU utilization is above a high CPU utilization border (e.g., 80%) or under a low utilization border (e.g., 20%). Data collected by the load monitor 210 is stored in a host data module 220, which also stores the configurable data items for each host 109 and the virtual machines 131. A host selection module 230 selects a host 109 from the cluster 103 to run a virtual machine based on the data stored in the host data module 220. The host selection module 230 can be used when a new virtual machine is to be run by the cluster 103, or when an existing virtual machine 131 needs to migrate from an active host 109 to another host 109 in the cluster 103. In the latter scenario, the existing virtual machine is one that currently runs on the active host 109. The migration of the existing virtual machine 131 may be caused by the active host 109 being overloaded, the active host 109 being shut down (i.e., powered off), or a load balancing process that evenly distributes load in the cluster 103. An active host 109 may be shut down to save power or when it is scheduled for maintenance. In some scenarios, an active host 109 having CPU utilization below a deactivation threshold (e.g., 10%) may be a candidate for power-off. The deactivation threshold is chosen in consideration of the cost of live migration of the virtual machines that run on a host to be powered-off. If the deactivation threshold is too high, the cost of live migration of all of the running virtual machines on a host may exceed the amount of power saving. The deactivation threshold is chosen such that power saved by shutting down the host outweighs the migration cost of the virtual machines.

When selecting a host to run a virtual machine, the host selection module 230 may first consider those hosts that are currently active. Among the active hosts, the host selection module 230 selects a host from those hosts having CPU utilization above the deactivation threshold (i.e., hosts that are not candidates for power-off) and below the high CPU utilization border by a safety margin (e.g., a configurable percentage). If such hosts cannot be found, the host selection module 230 then considers those active hosts that have CPU utilization level below the deactivation threshold. In an over-utilization scenario, all of the active hosts are overloaded or on the borderline of being overloaded. That is, none of the active hosts have sufficient memory or CPU resources to run the virtual machine. In this scenario, the host selection module 230 may activate an idle host, which is a host that currently has no activities but has not yet been powered off, to run the virtual machine. Activating an idle host is generally faster than turning on a host that has been powered off. The number of hosts that can be activated in the over-utilization scenario can be a configurable value determined by a user (e.g., a system administrator). When there is no other choice, the host selection module 230 may turn on a host that is currently powered off.

In one embodiment, the VM manager 120 further includes a load balancer 250 that runs a load balancing process in the background to balance the load among the hosts 109 in the cluster 103. Load balancing is a process to evenly distribute the load among the hosts 109. When the load balancer 250 detects a host to be overloaded, or the load in the cluster 103 is otherwise unevenly distributed, a VM selection module 240 selects a virtual machine on the host to move to another host. In one embodiment, the VM selection module 240 selects the virtual machine that incurs the least amount of load on the host. If the host is still overloaded after unloading the virtual machine, the VM selection module 240 can select, from the remaining virtual machines on the host, a next virtual machine that incurs the least amount of load on the host. Thus, virtual machines can be unloaded from an overloaded host, in a sequence ordered by their respective load incurred on the host, until the host reaches a normal level of load.

Figure 3:
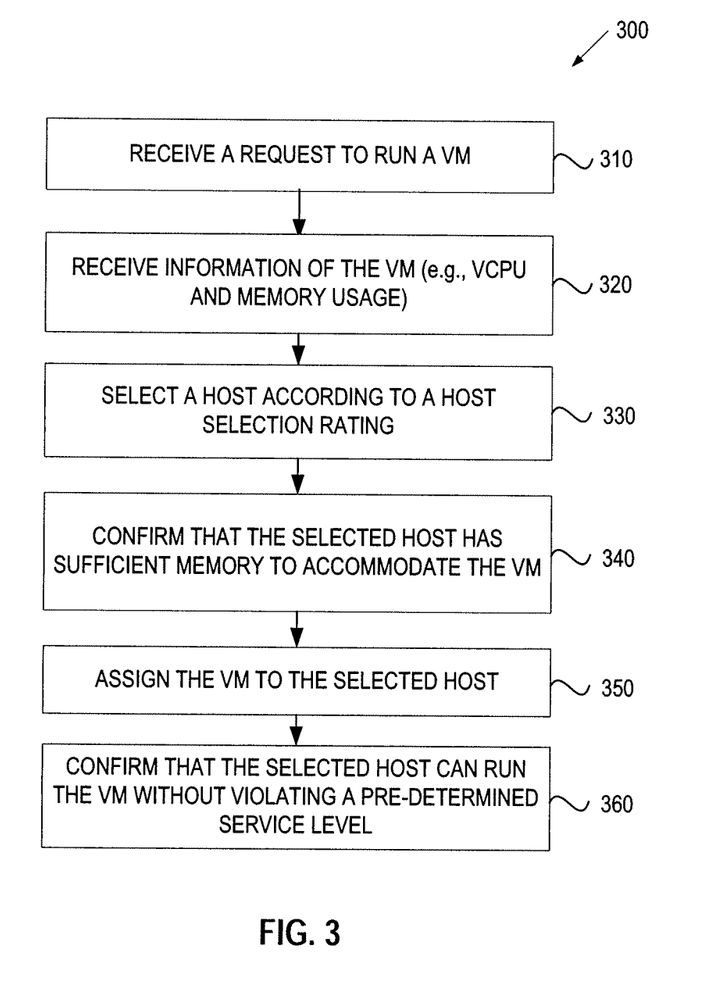
FIG. 3 is a flow diagram illustrating a method for adding a virtual machine to a selected host, in accordance with one embodiment of the present invention.

FIG. 3 is a flow diagram illustrating one embodiment of a method 300 for selecting a host to run a virtual machine. The virtual machine may be a new virtual machine to be used for running a virtual desktop on a remote client. Alternatively, the virtual machine may be an existing active virtual machine to migrate from one host to another host. The migration may be performed to save power or to distribute the load evenly among the hosts. The method 300 may be performed by processing logic 526 of FIG. 5 that may comprise hardware (e.g., circuitry, dedicated logic, programmable logic, microcode, etc.), software (e.g., instructions run on a processing device to perform hardware simulation), or a combination thereof. In one embodiment, the method 300 is performed by the VM manager 120 (FIGS. 1 and 2).

Referring to FIG. 3, in one embodiment, the method 300 begins when the VM manager 120 receives a request to run a virtual machine (block 310). The request can be received through the user interface device 260 from a user (e.g., a system administrator), or from a request internally generated by the host controller 103 to migrate a virtual machine to another host. A user may send the request to add a new virtual machine that supports a new virtual desktop remotely run on a client. A user may also send the request when unloading a virtual machine from a host to be powered off, from an overloaded host, or for other load balancing reasons. Alternatively, the host controller 103 may internally generate the request when it observes that a host is overloaded according to a predetermined criterion (e.g., CPU utilization is over a high CPU utilization border continuously for more than a predetermined time period).

The VM manager 120 can also receive information of the virtual machine to be run; e.g., the number of VCPUs requested by the virtual machines and requested memory usage (block 320). The information may be received from the user, or from an internal storage (e.g., the host data module 220 of FIG. 2) if it is already known. In response to the request, the VM manager 120 selects a host from the cluster 103 according to a host selection rating that is given to each host 109 in the cluster 103 (block 330). The host selection rating is based on a combination of a host's current CPU load and an expected loaded incurred by the pending virtual machine. In one embodiment, the host selection rating can be formulated as follows:

$$\text{Host\_cpu} \times \text{Host\_cores} / \text{VcpuConsumptionPercentage} + \text{PendingVcpus},$$

where Host_cpu is a percentage value representing the average CPU utilization of a core, Host_cores is the number of cores on the host, and VcpuConsumptionPercentage is a configurable value representing the "VCPU consumption percentage," which is configurable percentage value that estimates the load on a core incurred by a single virtual machine. The value of "Host_cpu×Host_cores/VcpuConsumptionPercentage" represents an estimation of the current CPU consumption of the host. PendingVcpus is the number of VCPUS (or cores) to be used by the pending virtual machine, which represents the expected load incurred by the pending virtual machine on the host. The host having the lowest host selection rating can be selected. That is, the host with the least amount of load is selected to run the virtual machine.

When there are multiple pending virtual machines to be added to the hosts in a batch, a host will be chosen for each pending virtual machine one at a time. Each time a host is selected, the corresponding pending virtual machine's PendingVcpus count will be added to the selected host's host selection rating. For example, a first host is selected to run a first virtual machine. The first host's host selection rating is updated by adding the first virtual machines' PendingVcpus count to its initial value. Immediately afterwards, when selecting a next host for the second virtual machine, the first host will have the updated rating while the other hosts still have their respective initial ratings. This process continues until all of the pending virtual machines find their hosts. The PendingVcpus count is included in the host selection rating to record an estimated effect of the pending virtual machine on its host. The host selecting ratings are recomputed each time a virtual machine or a batch of virtual machines need to find a host or hosts to run on.

In one embodiment, hosts that have CPU utilization exceeding or near the high CPU utilization border (e.g., within a predetermined safety margin) are excluded from the selection. In one embodiment, hosts that have CPU utilization below the deactivation threshold are also excluded from the selection, unless no other suitable hosts can be found.

After a host is selected, the VM manager 120 confirms that the selected host has sufficient memory to accommodate the virtual machine (block 340). The VM manager 120 may compare the requested memory size with an estimated host memory size, which is the physical memory size of the selected host multiplied by a configurable over-commitment percentage. If the requested memory size is larger, then the VM manager 120 finds another host that has the second lowest host selection rating. The VM manager 120 may continue the selection, in an increasing order of the host selection rating, until a host having sufficient memory is found. The VM manager 120 then assigns the virtual machine to the selected host (block 350). After the virtual machine is assigned to the selected host, the VM manager 120 confirms that the selected host can run the virtual machine without violating a predetermined service level; e.g., CPU utilization percentage and memory usage percentage (block 360).

If there is more than one pending virtual machine, the operations described above at blocks 310-360 are applied to each individual virtual machine sequentially.

Figure 4:
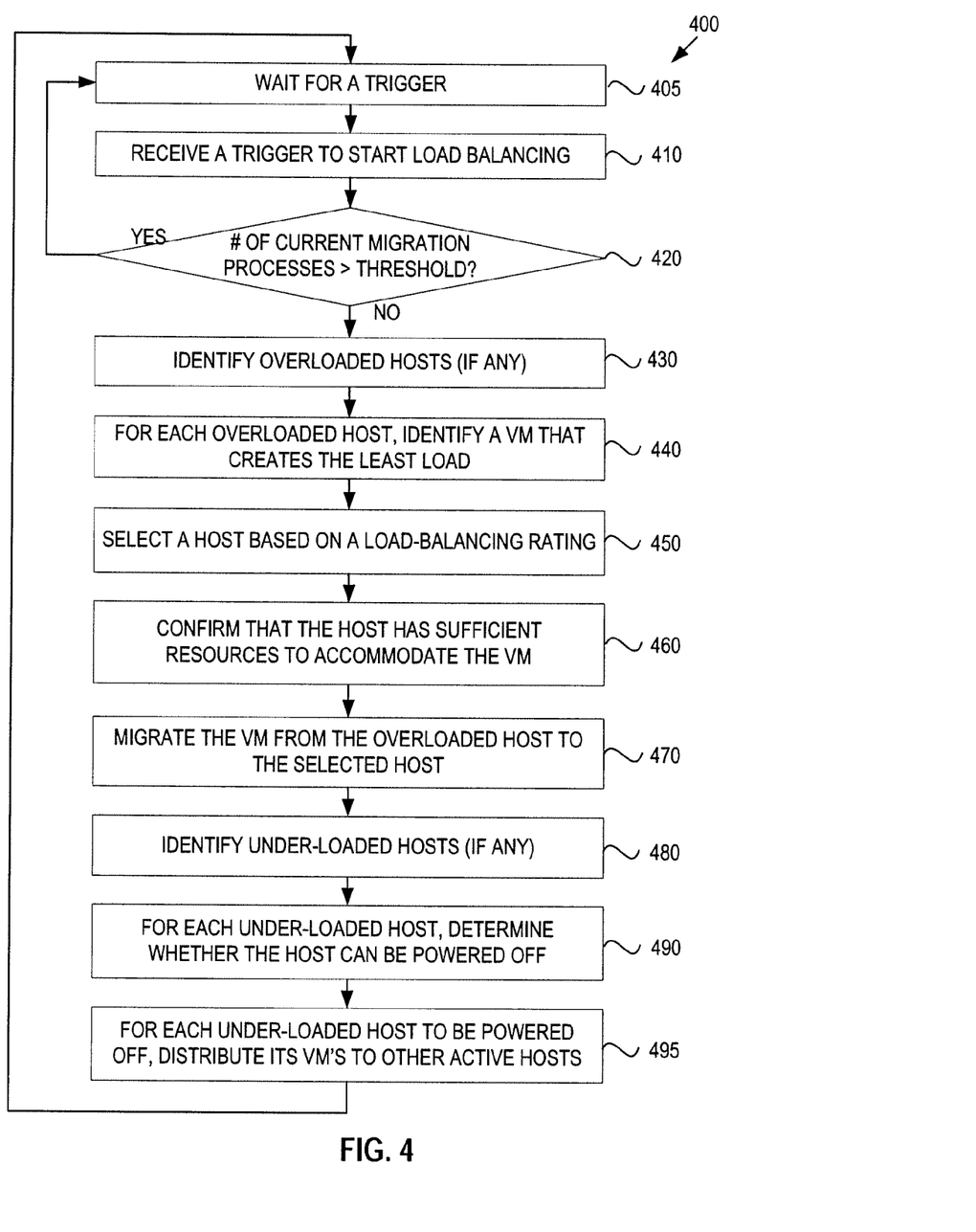
FIG. 4 is a flow diagram illustrating a method for live migration of existing virtual machines that run on a host cluster, in accordance with one embodiment of the present invention.

FIG. 4 is a flow diagram illustrating one embodiment of a method 400 for live migration of virtual machines for the purpose of load balancing. The method 400 may be performed by processing logic 526 of FIG. 5 that may comprise hardware (e.g., circuitry, dedicated logic, programmable logic, microcode, etc.), software (e.g., instructions run on a processing device to perform hardware simulation), or a combination thereof. In one embodiment, the method 400 is performed by the load balancer 250 as a background process (FIG. 2). For example, after a virtual machine is assigned to run on a selected host (e.g., with the use of the above method 300), the load balancer 250 may perform the method 400 continuously in the background to balance the load. In the description that follows, the method 400 includes a loop that runs a migration process at each instance of the loop.

Referring to FIG. 4, the load balancer 250 waits for a trigger to start a new migration process (block 405). The trigger may be a timer that expires on fixed intervals. When the load balancer 250 receives the trigger (block 410), the load balancer 250 compares the number of virtual machines that are currently in the process of being migrated with a threshold (block 420). The comparison is performed to limit the number of virtual machines that may be concurrently migrated to avoid overloading the system. If the number of such virtual machines is greater than the threshold, then the load balancer 250 delays the start of the new migration process and waits for a next trigger (block 430). If the number of such virtual machines is not greater than the threshold (block 420), the load balancer 250 starts the new migration process. The load balancer 250 identifies overloaded hosts in the cluster 103, if there are any (block 430). In one embodiment, the determination is based on the CPU utilization of the host. For example, if the CPU utilization of a host is greater than a high CPU utilization border (e.g., 75%) continuously for more than a predetermined time period (e.g., two minutes), the host is considered to be overloaded. For each overloaded host, the load balancer 250 identifies a virtual machine on the host that creates the least amount of load (block 440). In one embodiment, the amount of load incurred by a virtual machine is calculated by a percentage value representing the CPU usage of the virtual machine. The load balancer 250 then selects a target host as the destination for migration based on a load balancing rating that is given to each active host (block 450). In one embodiment, the load balancing rating can be formulated as follows:

$$Host\_cpu \times Host\_cores/Host\_strength,$$

where Host_cpu is a percentage value representing the average CPU utilization of a core, Host_cores is the number of cores on the host, and Host_strength is a configurable value representing the "host strength," which is a grade given by a user (e.g., a system administrator) to a host. The grade can be given based on the processing speed, powerfulness of the host architecture, host operating environment, and/or other factors perceived by the user to be important. The host having the lowest load balancing rating, which is also the least loaded host, can be selected as the target host for migration.

In one embodiment, only the hosts having CPU utilization above the deactivation threshold (e.g., 10%) are considered as a destination for migration. The hosts to be considered as a destination for migration may be low utilization hosts, which have CPU utilization below a low CPU utilization border (e.g., 20%) continuously for more than a predetermined time period (e.g., two minutes). Alternatively, the hosts to be considered may have an average CPU utilization below or near the low CPU utilization border. The hosts having CPU utilization below the deactivation threshold are candidates for shut down and will not be a destination for the migration. Overloaded hosts, which are hosts that have CPU utilization above the high CPU utilization border continuously for a predetermined time period, are excluded from consideration. Hosts that are not overloaded but are within a safety margin from the high CPU utilization border can also be excluded from consideration to prevent thrashing; that is, assignment of the virtual machine causes a host to become overloaded and removal of the virtual machine causes the host to stop being overloaded. If there is more than one host that can be considered as a target (that is, a destination for migration), the host having the lowest load balancing rating is selected. If no suitable host can be found, the virtual machine may stay on the current host until the next run of the migration process starts.

After a target host is selected, the load balancer 250 confirms that the selected host has sufficient resources; e.g., CPU resources and memory resources to accommodate the virtual machine (block 460). The VM selected at block 440 is then migrated from the overloaded host to the host selected at block 450 (block 470).

In one embodiment, the load balancer 250 also identifies under-loaded hosts, if there are any (block 480). For each under-loaded host, the load balancer 250 determines whether the host can be powered off (block 490). In one embodiment, a host is determined to be under-loaded based on the CPU utilization of the host. For example, if the CPU utilization of a host is below a deactivation threshold (e.g., 10%) for more than a predetermined time period (e.g., two minutes), the host is considered to be under-loaded. If the number of idle hosts (i.e., hosts having no activities but not yet powered-off) is less than a configurable cap number, then the under-loaded host can be powered off. For each under-loaded host to be powered off, the load balancer 250 distributes all of its virtual machines to other active hosts (block 495). In one embodiment, the virtual machines can be distributed, one virtual machine at a time, using either the operations described above at blocks 450-470, or the method 300 described above. If an under-load host cannot be powered off, the load balancer 250 may move the virtual machines from other hosts to the under-loaded host to balance the load.

It is understood that the various thresholds mentioned above (e.g., high/low CPU utilization border, deactivation threshold, predetermined time periods, safety margin, etc.) are configurable by the user. Thus, a user (e.g., a system administrator) can adjust these values according to the runtime environment. It is also understood that, unless otherwise specified, a CPU utilization level is an average CPU utilization level measured over a pre-determined period of time.

Figure 5:
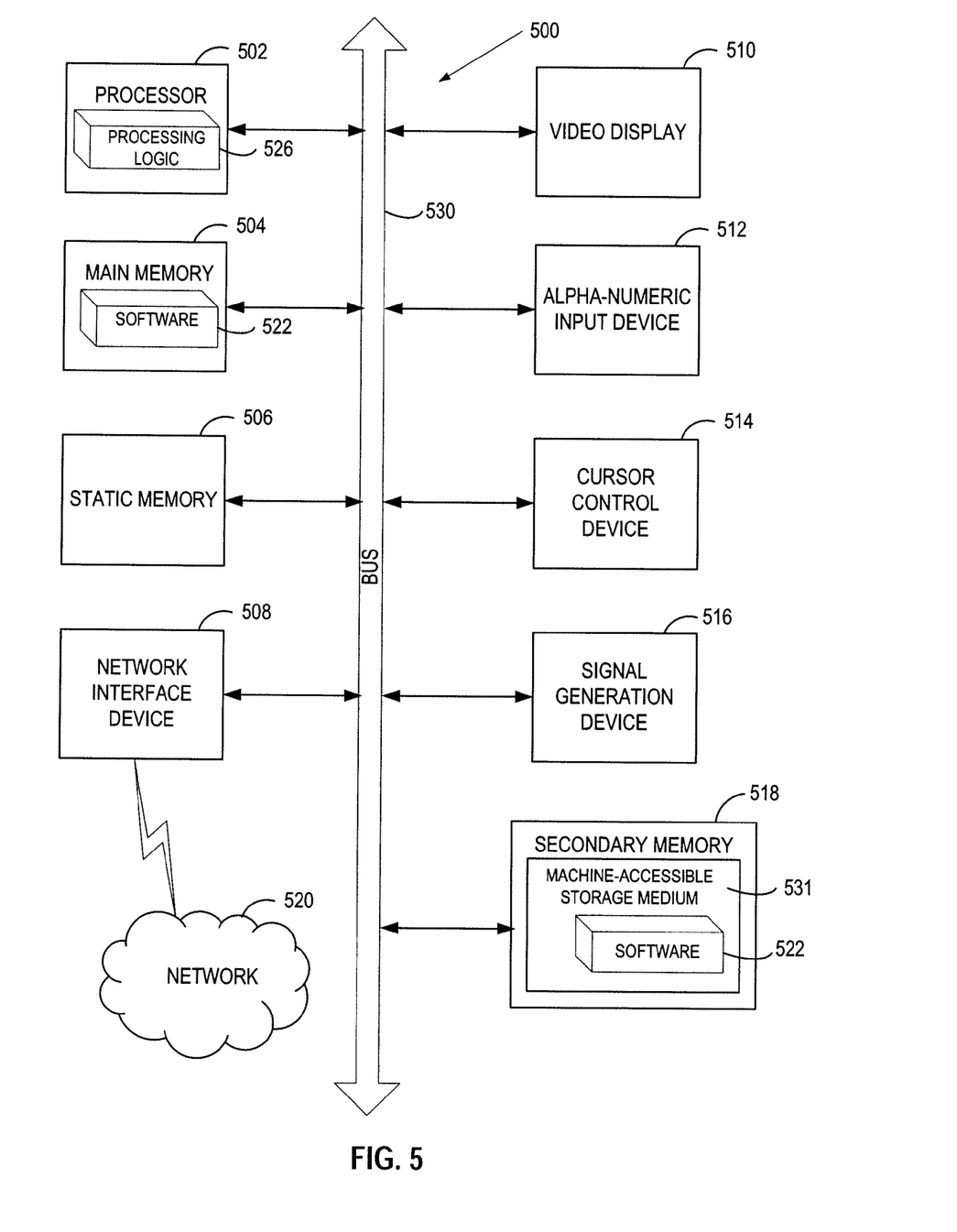
FIG. 5 illustrates a diagrammatic representation of a machine in the exemplary form of a computer system, in accordance with one embodiment of the present invention.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 518 (e.g., a data storage device), which communicate with each other via a bus 530.

The processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The secondary memory 518 may include a machine-readable storage medium (or more specifically a computer-readable storage medium) 531 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500; the main memory 504 and the processing device 502 also constituting machine-readable storage media. The software 522 may further be transmitted or received over a network 520 via the network interface device 508.

The machine-readable storage medium 531 may include the VM manager 120 of FIG. 2. While the machine-readable storage medium 531 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
receiving, by a processor, a request to run a virtual machine on a host cluster comprising a plurality of hosts, at least one of the plurality of hosts comprising a plurality of cores;
determining a number of cores to be used by the virtual machine less than a number of the plurality of cores;
determining, for one or more hosts of the plurality of hosts, one or more corresponding current processor consumptions;
selecting, by the processor, one of the plurality of hosts based on the number of cores to be used by the virtual machine and the corresponding current processor consumptions; and
assigning, by the processor, the virtual machine to run on the number of cores of the selected one of the plurality of hosts.

2. The method of claim 1, wherein determining one or more corresponding current processor consumptions comprises:
estimating, for one or more hosts of the plurality of hosts, one or more corresponding current processor consumptions of the corresponding host based on average processor utilization per core of the corresponding host multiplied by the number of cores on the corresponding host.

3. The method of claim 1, wherein selecting one of the plurality of hosts comprises:
selecting one of the plurality of hosts based on a configurable percentage value that estimates the amount of load on a core incurred by a single virtual machine.

4. The method of claim 1, wherein the virtual machine is a new virtual machine to be added to the host cluster.

5. The method of claim 1, wherein the virtual machine is an existing virtual machine to be migrated from a currently active host in the host cluster.

6. The method of claim 1, wherein assigning the virtual machine comprises:
multiplying a physical memory size of the selected one of the plurality of hosts by an over-commitment ratio to obtain an estimated memory size; and
confirming that the estimated memory size is sufficient to accommodate the virtual machine.

7. The method of claim 1, wherein selecting one of the plurality of hosts further comprises:
selecting one of the plurality of hosts that has a utilization level above a deactivation threshold, below which the one of the plurality of hosts is to be powered off.

8. The method of claim 1, further comprising:
receiving a request to run a plurality of virtual machines on the host cluster; and
selecting, sequentially, one host for each of the plurality of virtual machines.

9. A non-transitory computer readable storage medium including instructions that, when executed by a processor, cause the processor to perform operations comprising:
receiving, by the processor, a request to run a virtual machine on a host cluster that comprises a plurality of hosts, at least one of the plurality of hosts comprising a plurality of cores;
determining a number of cores to be used by the virtual machine less than a number of the plurality of cores;
determining, for one or more hosts of the plurality of hosts, one or more corresponding current processor consumptions;
selecting, by the processor, one of the plurality of hosts based on the number of cores to be used by the virtual machine and the corresponding current processor consumptions; and
assigning, by the processor, the virtual machine to run on the number of cores of the selected one of the plurality of hosts.

10. The non-transitory computer readable storage medium of claim 9, wherein determining one or more corresponding current processor consumptions comprises:
estimating, for one or more of the plurality of hosts, one or more current processor consumptions of the corresponding hosts based on average processor utilization per core of the corresponding host multiplied by the number of cores on the corresponding host.

11. The non-transitory computer readable storage medium of claim 9, wherein selecting one of the plurality of hosts comprises:
selecting one of the plurality of hosts based on a configurable percentage value that estimates the amount of load on a core incurred by a single virtual machine.

12. The non-transitory computer readable storage medium of claim 9, wherein assigning the virtual machine comprises:
multiplying a physical memory size of selected one of the plurality of hosts by an over-commitment ratio to obtain an estimated memory size; and
confirming that the estimated memory size is sufficient to accommodate the virtual machine.

13. The non-transitory computer readable storage medium of claim 9, wherein selecting one of the plurality of hosts comprises:
selecting one of the plurality of hosts that has a utilization level above a deactivation threshold, below which the one of the plurality of hosts is to be powered off.

14. The non-transitory computer readable storage medium of claim 9, the operations comprising:
receiving a request to run a plurality of virtual machines on the host cluster; and
selecting, sequentially, one host for each of the plurality of virtual machines.

15. A system comprising:
a memory;
a processor coupled to the memory;
a virtual machine manager executed from the memory by the processor to receive a request to run a virtual machine on a host cluster comprising a plurality of hosts, at least one of the plurality of hosts comprising a plurality of cores, to determine a number of cores to be used by the virtual machine less than a number of the plurality of cores, and to assign the virtual machine to run on the number of cores of one of the plurality of hosts; and
a host selection module executed from the memory by the processor to determine, for one or more hosts of the plurality of hosts, one or more corresponding current processor consumptions and to select one of the plurality of hosts based on the number of cores to be used by the virtual machine and the corresponding current processor consumptions.

16. The system of claim 15, wherein the processor is coupled to a user interface to receive the request from a user to run the virtual machine.

17. The system of claim 15, wherein the request is internally generated by the virtual machine manager to migrate the virtual machine from a current host to another host.

18. The system of claim 15, wherein the host selection module estimates, for one or more of the plurality of hosts, one or more current processor consumptions based on average processor utilization per core of the corresponding hosts multiplied by the number of cores on the corresponding host.

19. The system of claim 15, wherein the host selection module estimates, for one or more of the plurality of hosts, one or more current processor consumptions based on a configurable percentage value for the corresponding host that estimates the amount of load on a core incurred by a single virtual machine.

20. The system of claim 15, wherein the host selection module confirms that the selected one of the plurality of hosts has sufficient memory to accommodate the virtual machine by multiplying a physical memory size of the selected host by an over-commitment ratio.

* * * * *